(12) United States Patent
Normand et al.

(10) Patent No.: US 9,415,855 B2
(45) Date of Patent: Aug. 16, 2016

(54) WING PANEL FOR AIRCRAFT

(71) Applicant: Airbus Operations (SAS), Toulouse (FR)

(72) Inventors: Mathieu Normand, Toulouse (FR); Olivier Frot, Cadours (FR); Erik Cresto, Toulouse (FR); Sebastien Azam, Mondonville (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 121 days.

(21) Appl. No.: 14/197,945

(22) Filed: Mar. 5, 2014

(65) Prior Publication Data

US 2014/0272264 A1   Sep. 18, 2014

(30) Foreign Application Priority Data

Mar. 18, 2013   (FR) ...................... 13 52381

(51) Int. Cl.
| | |
|---|---|
| *B32B 3/18* | (2006.01) |
| *B32B 3/24* | (2006.01) |
| *B64C 3/24* | (2006.01) |
| *B64C 3/26* | (2006.01) |
| *B64C 3/28* | (2006.01) |
| *B64C 5/08* | (2006.01) |
| *B64C 9/02* | (2006.01) |

(Continued)

(52) U.S. Cl.
CPC ... *B64C 3/26* (2013.01); *B32B 3/04* (2013.01); *B32B 3/12* (2013.01); *B32B 3/266* (2013.01); *B32B 15/08* (2013.01); *B32B 27/08* (2013.01); *B32B 27/20* (2013.01); *B64C 1/12* (2013.01); *B64C 9/02* (2013.01); *B32B 3/06* (2013.01); *B32B 3/18* (2013.01); *B32B 5/18* (2013.01); *B32B 7/08* (2013.01); *B32B 2262/106* (2013.01); *B32B 2605/18* (2013.01); *B64C 3/20* (2013.01); *B64C 3/28* (2013.01); *B64C 3/38* (2013.01); *B64C 5/08* (2013.01); *Y10T 428/163* (2015.01); *Y10T 428/24008* (2015.01); *Y10T 428/24174* (2015.01); *Y10T 428/24322* (2015.01); *Y10T 428/249923* (2015.04)

(58) Field of Classification Search
None
See application file for complete search history.

(56) References Cited

U.S. PATENT DOCUMENTS 2,327,585 A * 8/1943 Ulrich .................... B62D 21/09
                                                        280/797
2,484,141 A * 10/1949 Alex ..................... B64C 27/473
                                                        156/185

(Continued)

FOREIGN PATENT DOCUMENTS

CN         101273207 A      9/2008
DE    WO 2011073099 A1 *    6/2011  ............... F16B 5/01

(Continued)

OTHER PUBLICATIONS

Machine Translation of WO 2013030960 A1, Mar. 2013.*

(Continued)

*Primary Examiner* — Jeff Vonch
(74) *Attorney, Agent, or Firm* — Greer, Burns & Crain, Ltd.

(57) ABSTRACT

A panel for an aircraft wing, having a sandwich structure in which there is arranged a reinforcing part. When the panel is attached to a bracket so as to be articulated to another element, the reinforcing part is provided in order to distribute, over its entire surface, a force transmitted by the bracket to the panel.

15 Claims, 4 Drawing Sheets

(51) Int. Cl.
   *B32B 7/08*       (2006.01)
   *B32B 5/20*       (2006.01)
   *B64C 3/20*       (2006.01)
   *B64C 3/38*       (2006.01)
   *B32B 3/26*       (2006.01)
   *B64C 1/12*       (2006.01)
   *B32B 15/08*      (2006.01)
   *B32B 27/08*      (2006.01)
   *B32B 27/20*      (2006.01)
   *B32B 3/04*       (2006.01)
   *B32B 3/12*       (2006.01)
   *B32B 5/18*       (2006.01)
   *B32B 3/06*       (2006.01)

(56) References Cited

U.S. PATENT DOCUMENTS

| | | | | |
|---|---|---|---|---|
| 2,585,557 | A * | 2/1952 | Kreimendahl | F16B 5/01 411/955 |
| 2,607,447 | A * | 8/1952 | Tuttle | E04B 1/40 428/116 |
| 2,961,760 | A * | 11/1960 | Horton | B21D 47/00 16/2.1 |
| 2,967,593 | A * | 1/1961 | Cushman | F16B 5/01 16/2.1 |
| 3,020,986 | A * | 2/1962 | Kirk | B64C 3/00 244/123.13 |
| 3,137,887 | A * | 6/1964 | Mannino | F16B 5/01 16/2.1 |
| 3,193,221 | A * | 7/1965 | Parshley | B64C 25/52 244/100 R |
| 3,526,072 | A * | 9/1970 | Campbell | F16B 5/01 29/452 |
| 3,716,092 | A * | 2/1973 | Serewicz | B64C 1/12 411/82.5 |
| 3,813,186 | A * | 5/1974 | Palachek | B64C 27/473 416/144 |
| 3,987,983 | A * | 10/1976 | Cole | B64C 9/20 244/216 |
| 4,000,870 | A * | 1/1977 | Davies | B64D 9/003 244/137.1 |
| 4,211,046 | A * | 7/1980 | Shahan | E04B 1/86 248/613 |
| 4,273,818 | A * | 6/1981 | Buchs | B29D 24/005 136/292 |
| 5,098,043 | A * | 3/1992 | Arena | B64C 13/26 244/215 |
| 5,224,670 | A * | 7/1993 | Padden | B64C 3/20 244/123.3 |
| 5,346,367 | A * | 9/1994 | Doolin | B29D 99/0025 156/213 |
| 5,865,397 | A | 2/1999 | Herrmann | |
| 6,055,790 | A * | 5/2000 | Lunde | F16B 5/01 52/787.1 |
| 6,530,191 | B2 * | 3/2003 | Rieke | E04C 2/292 428/178 |
| 7,666,493 | B2 * | 2/2010 | Endres | B31D 3/002 428/131 |
| 8,506,743 | B2 * | 8/2013 | Endres | B31D 3/002 156/196 |
| 2001/0003888 | A1 * | 6/2001 | Bertin | F16B 5/01 52/783.1 |
| 2004/0055248 | A1 | 3/2004 | Grillos | |
| 2007/0009712 | A1 * | 1/2007 | Roth | B29C 70/088 428/172 |
| 2007/0264472 | A1 * | 11/2007 | Bozhevolnaya | B32B 3/12 428/156 |
| 2009/0184204 | A1 * | 7/2009 | Piehl | B32B 3/18 244/133 |
| 2010/0065687 | A1 * | 3/2010 | Douglas | B64C 3/185 244/130 |
| 2011/0183104 | A1 * | 7/2011 | Juergens | B29C 70/086 428/116 |
| 2011/0233338 | A1 * | 9/2011 | Stewart | B64C 3/28 244/131 |
| 2012/0251235 | A1 * | 10/2012 | Klaukien | F16B 5/01 403/404 |

FOREIGN PATENT DOCUMENTS

| | | | | |
|---|---|---|---|---|
| FR | 2891325 | | 3/2007 | |
| FR | 2905739 | | 3/2008 | |
| JP | 05116267 | A * | 5/1993 | |
| JP | 05154956 | A * | 6/1993 | |
| JP | 09300501 | A * | 11/1997 | |
| JP | 10016098 | A * | 1/1998 | |
| JP | 10071658 | A * | 3/1998 | |
| JP | 10180914 | A * | 7/1998 | |
| JP | 2007168397 | A * | 7/2007 | |
| JP | 2010286046 | A * | 12/2010 | |
| JP | 2011126296 | A * | 6/2011 | |
| JP | WO 2013030960 | A1 * | 3/2013 | F16B 5/01 |
| WO | 2012090518 | | 7/2012 | |

OTHER PUBLICATIONS

French Search Report, Oct. 25, 2013.

\* cited by examiner

AV ← → AR

WING PANEL FOR AIRCRAFT

CROSS-REFERENCES TO RELATED APPLICATIONS

This application claims the benefit of the French patent application No. 20130052381 filed on Mar. 18, 2013, the entire disclosures of which are incorporated herein by way of reference.

BACKGROUND OF THE INVENTION

The present invention relates to a wing panel for aircraft.

In an aircraft, the wing panels generally form the ailerons, the spoilers or the flaps. To that end, a wing panel is typically articulated and actuated, relative to another adjacent panel or to a lifting surface of the aircraft, by means of brackets.

When a panel is actuated, forces are transmitted to the structure of the panel via the brackets and this gives rise to a considerable concentration of stress at each bracket and more particularly at the means for assembling the panel with the bracket.

SUMMARY OF THE INVENTION

It is a particular object of the invention to reduce these stresses by proposing an improved panel. To that end, the present invention relates to a panel comprising a first skin and a second skin attached to one another, the panel comprising a core arranged in a volume delimited by an assembly of the first and the second skin, between an internal face of the first skin and an internal face of the second skin, wherein the panel further comprises a reinforcing part arranged in a cut-out made in the core, the reinforcing part comprising a flank having one face parallel to and in contact with the internal face of either the first or the second skin, and at least one cylindrical tube secured to the flank arranged perpendicular to the face of the flank, each tube surrounding, in the position of use, an assembly means passing through the panel from the first to the second skin and having one end in contact with the external face of the other of the first and second skins.

BRIEF DESCRIPTION OF THE DRAWINGS

Other features, details and advantages of the invention will appear more clearly from the indicative detailed description below, with reference to drawings in which.

In all of these figures, identical references designate identical or analogous elements.

DETAILED DESCRIPTION OF THE PREFERRED EMBODIMENTS

Figure 1:
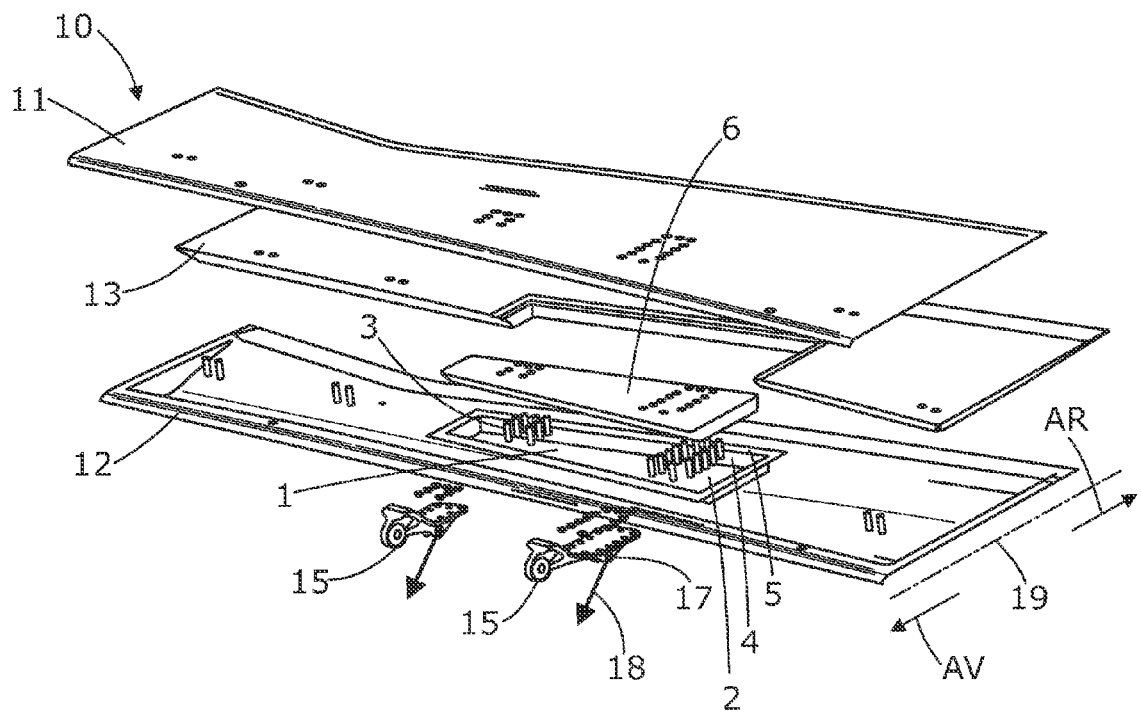
FIG. 1 shows, in a perspective exploded view, a panel according to one embodiment of the invention.

FIG. 1 shows an aircraft wing panel 10 according to one embodiment of the invention. Such a panel 10 has a sandwich structure typically comprising a first skin 11 and a second skin 12, each skin having an external and an internal face.

In the example shown in FIG. 1, the two skins are substantially planar. They may nonetheless have other shapes.

These two skins are made of composite material, such as carbon fiber reinforced plastic (CFRP). The panel 10 further comprises a core 13 made of cellular material occupying the volume comprised between, and delimited by, the internal faces of the two skins 11, 12. The cellular material is, for example, a honeycomb structure or polyurethane-type mousse.

Such a panel 10 is typically attached/articulated to another panel or to a cell via at least one bracket 15. To that end, and as shown in FIG. 1, the bracket 15 comprises, for example, a sole, the shape of which is complementary to an external surface (i.e: the external face) of the skin 12 of the panel 10. Another part of the bracket 15 is formed so as to provide the attachment and/or the articulation to another panel or to a lifting surface of the aircraft. The bracket 15 comprises, in a known manner, at least one bore enabling interfacing with an articulation shaft and/or an actuation rod.

The assembly interface between a bracket 15 and a panel 10 has a substantially reduced contact surface at the sole. It follows that any force 18, applied at an application point 17, is transmitted via the bracket 15 and induces, in the panel 10, stresses which are localized and therefore large.

Figure 2:
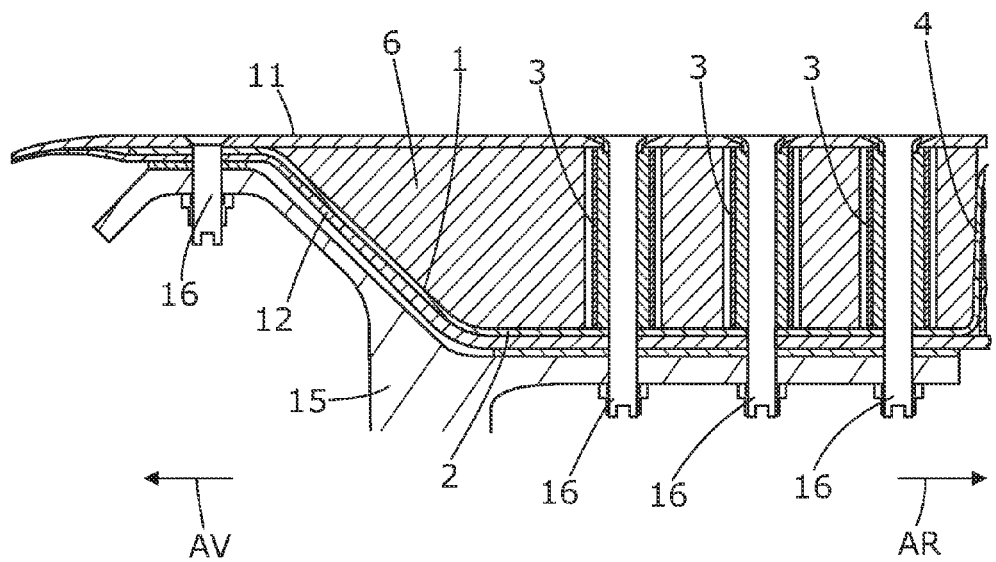
FIG. 2 shows, in a transverse section view, a detail of a panel/reinforcing part/bracket interface according to one embodiment of the invention.

With reference to FIG. 2, the assembly of a bracket 15 and a panel 10 is typically created using at least one assembly means 16.

An assembly means 16 extends principally right through the panel 10 and the two skins 11, 12 thereof, in a preferred direction transverse thereto. Such an assembly means 16 is a nut-and-bolt assembly.

In this case, on the side of the panel 10, the head of the bolt presses against the external face of the skin 11. On the side of the bracket 15, each assembly means 16 is secured to the bracket 15, with a nut preventing one end of the assembly means 16 passing through the bracket 15 from moving in translation.

Alternatively, the assembly means 16 is a rivet, a pin or any other equivalent means.

The panel 10 further comprises a reinforcing part 1 formed such that it can be positioned at the assembly between at least one bracket 15 and a panel 10. The reinforcing part 1 comprises a flank 2 and at least one cylindrical tube 3, in contact with the flank 2.

The flank 2 is positioned in a cut-out made in the core 13, and is therefore positioned in a volume comprised between, and delimited by, the two skins 11, 12.

The flank 2 comprises one face in contact with, for example bonded to, the internal surface of the skin 12, and facing the other skin 11. This face covers at least that surface of the skin 12 that faces the sole of at least one bracket 15 opposite it. If the panel 10 is equipped with more than one bracket 15, as shown in FIG. 1, the flank 2 advantageously covers, in a single stretch, at least that surface of the skin 12 that faces the soles of the brackets 15 opposite it.

Each cylindrical tube 3 surrounds an assembly means 16, in the assembly position, and extends over substantially the entire length of the assembly means 16. Each cylindrical tube 3 is arranged so as to surround one assembly means 16 and has a circular external cross section. In one variant, this external cross section is for example square, elliptical, hexagonal, etc.

Figure 3:
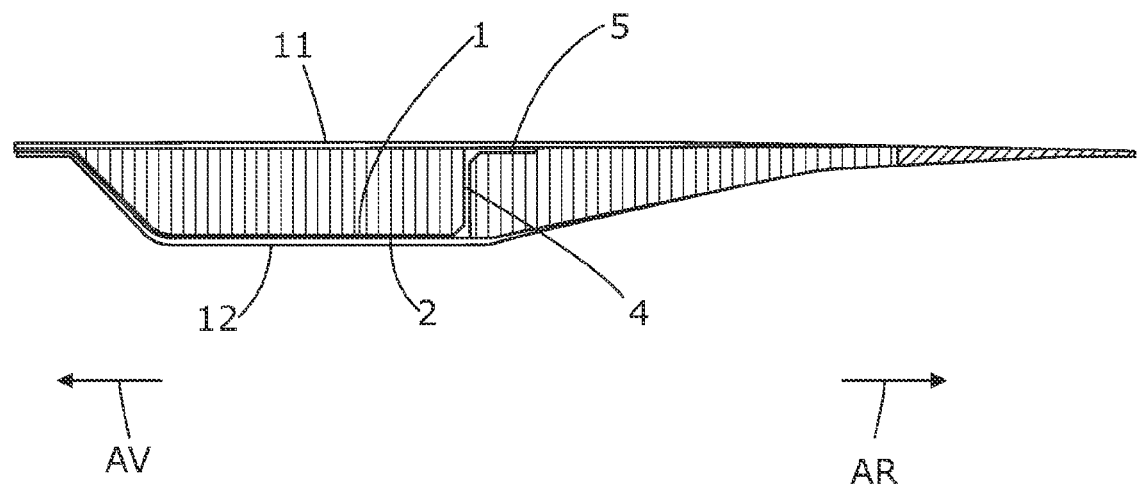
FIG. 3 shows, in a transverse section view, a panel equipped with a reinforcing part according to one embodiment of the invention.
Figure 7:
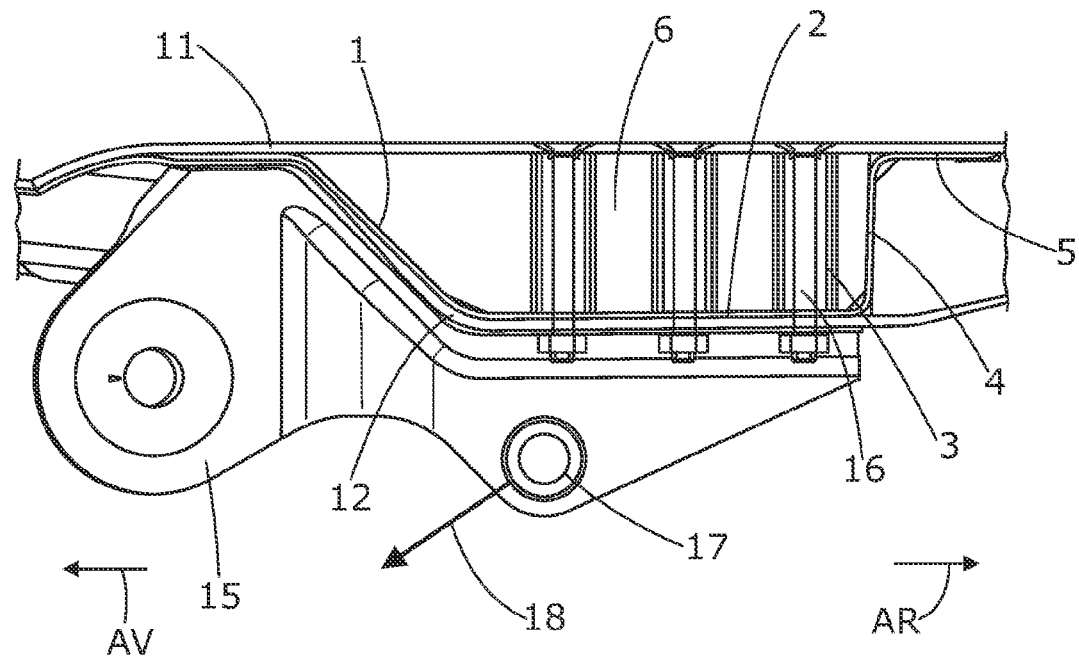
FIG. 7 shows, in a transverse section view, a detail of a panel/reinforcing part/bracket interface according to one embodiment of the invention.

According to another feature, more particularly shown in FIGS. 3 and 7, the reinforcing part 1 further comprises at least one stiffener 4 provided with a rim 5.

The reinforcing part 1 is formed such that, when one face of the flank 2 is in contact with the internal surface of the skin 12, the rim 5 is in contact with the other skin 11, substantially parallel to the other skin 11.

The stiffener 4 is transverse to the flank 2 and is transverse to the rim 5. The profile of the assembly formed by the flank 2, the stiffener 4 and the rim 5 is thus substantially Z-shaped. The stiffener 4 is therefore transverse to the two skins 11, 12 and forms a spacer between the two skins 11, 12 which contributes to producing a stiffener for the panel 10. The stiffener 4 thus resists a stress acting to bring the two skins 11, 12 together.

By having a first angle which is substantially a right angle between the flank 2 and the stiffener 4, and a second angle which is substantially a right angle between the stiffener 4 and the rim 5 thereof, this configuration makes it also possible, advantageously, to stiffen the reinforcing part 1.

According to one advantageous embodiment, the rim 5 is secured, for example by bonding, to the skin 11. The stiffener 4 thus also resists a stress acting to separate the two skins 11, 12.

According to another embodiment, a reinforcing part 1 can comprise a single stiffener 4, upon which is mounted a rim 5. Such a configuration can be termed unidirectional. However, in order to accentuate the effect of rigidity imparted by the stiffener 4, it is advantageous that the shape of the stiffener 4 be two-dimensional, as described in the following embodiments, described with reference to FIGS. 4-6, as seen from above.

Figure 4:
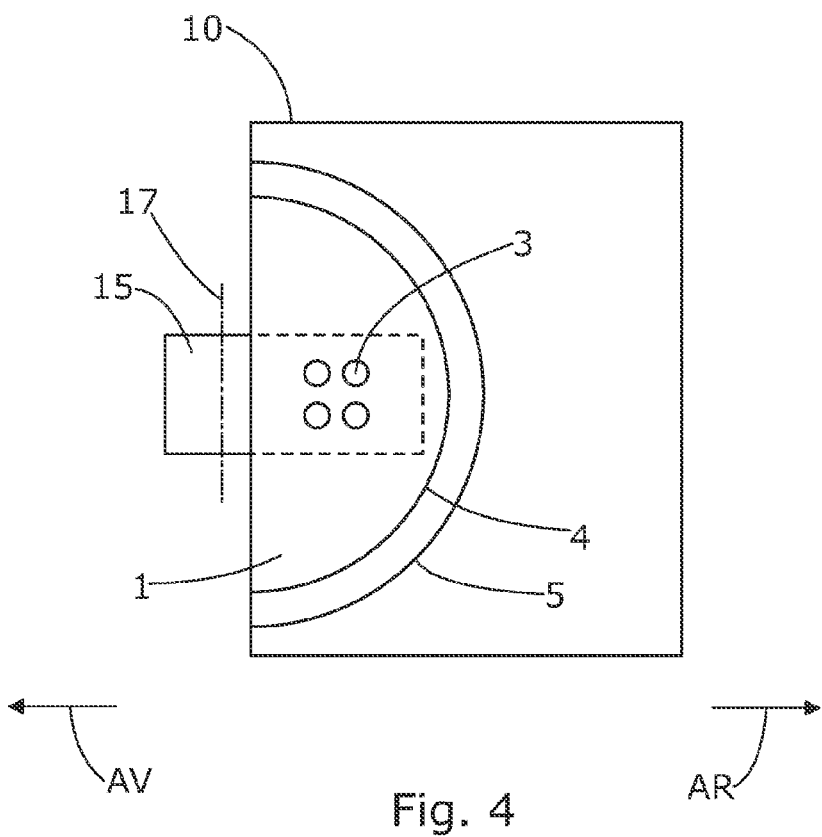
FIGS. 4-6 show, as seen from above, a panel/reinforcing part/bracket interface according to various embodiments of the invention.

FIG. 4 shows another embodiment in which the reinforcing part 1, designed for a single bracket 15, comprises a stiffener 4 and an associated rim 5 which are circular in the plane of the face of the flank 2 in contact with the internal face of the skin 12. The stiffener 4 preferably forms an arc of a circle and is positioned around the bracket 15 and thus around the cylindrical tube or tubes 3. The arc of a circle can thus be centered on the cylindrical tube or tubes 3.

Figure 6:
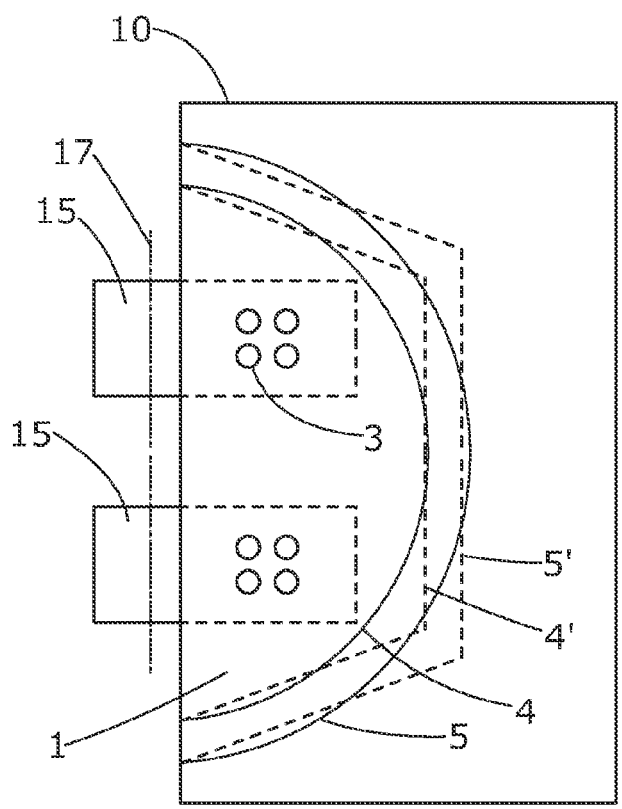

The reinforcing part 1 can also be designed for more than one bracket 15, as shown in FIG. 6 with two such brackets 15. In such a case of multiple brackets 15, the stiffener 4, 4' is advantageously positioned around the brackets 15 and thus around the cylindrical tubes 3. The stiffener 4, 4' is thus centered substantially on the center of mass of the cylindrical tubes 3 of the various brackets 15.

Although a circular/elliptic shape of the stiffener 4 is ideal in terms of distribution of the stresses and of rigidity of the reinforcing part 1, such a shape can be more difficult to produce. It is also advantageous to replace a circular shape of the stiffener 4, surrounding one or more brackets 15, with a polyhedral shape.

Figure 5:
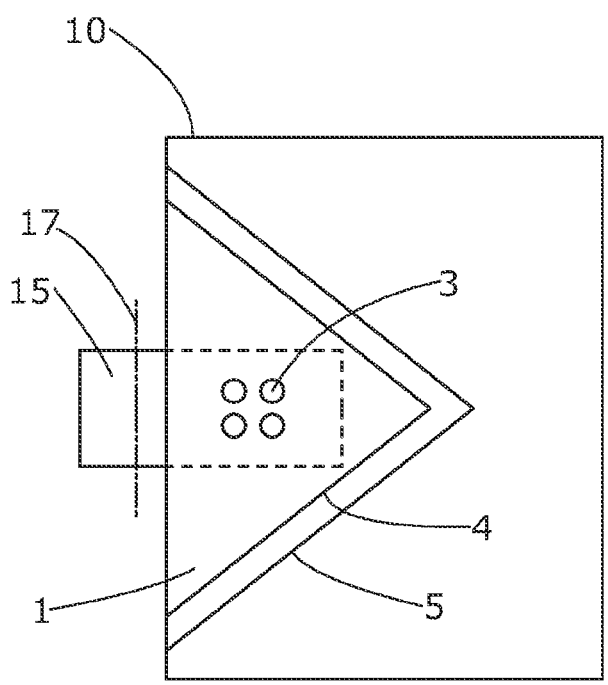

FIG. 5 shows an example in which a stiffener 4 has, in the plane of the face of the flank 2 in contact with the internal face of the skin 12, a two-sided polyhedral shape which can be positioned around a single bracket 15.

FIG. 6 shows, in superposition, an embodiment, represented in solid lines, in which the stiffener 4 and the associated rim 5 have a shape which is substantially elliptical around two brackets 15, and an alternative embodiment, represented in dashed lines, in which the stiffener 4' and the associated rim 5' have a three-sided polyhedral shape, in this case trapezoidal, around the same two brackets 15.

In order to simplify the production of a reinforcing part 1, it can, depending on the fabrication technology, be advantageous that the reinforcing part 1 comprise stiffeners 4 and rims 5 over the entire periphery/all the sides of the flank 2. The reinforcing part 1 is thus formed as a "box". The flank 2 forms the base of the box. The box is open on a face opposite the flank 2. The box has stiffeners 4 all around its periphery.

Figure 8:
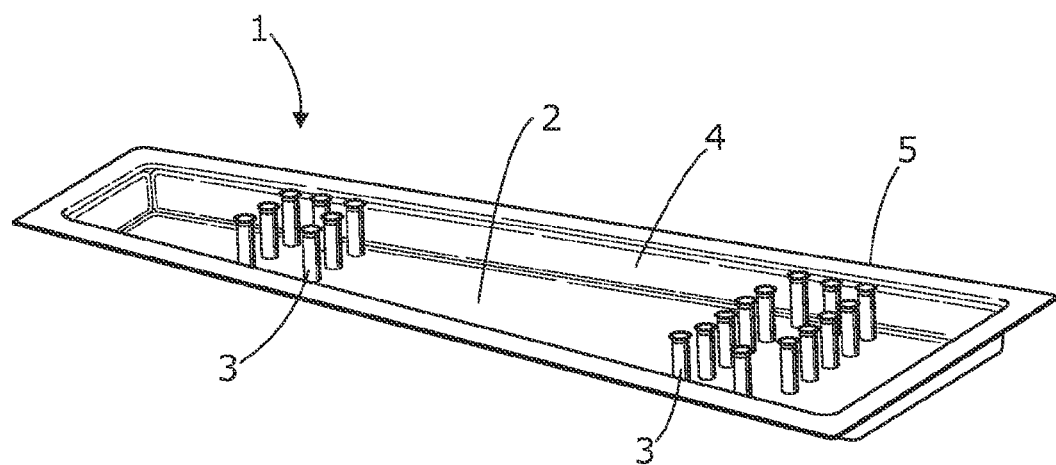
FIG. 8 shows, in a perspective view, a reinforcing part according to one preferred embodiment of the invention.

One exemplary embodiment of such a reinforcing part 1 is shown in FIG. 8. This reinforcing part 1 has a stiffener 4 of substantially quadrangular shape, having four straight sides, and surrounds two brackets 15.

The reinforcing part 1 can be made of composite material. Thus, as with the skins 11, 12 of the panel 10, it can be made of carbon fiber reinforced plastic (CFRP).

Alternatively, the reinforcing part 1 can be made of metal. It is further possible to combine composite material and metal in order to produce the reinforcing part 1.

The reinforcing part 1 may be made as a single part comprising a flank 2, at least one stiffener 4 and at least one rim 5, and also the cylindrical tube or tubes 3. Alternatively, the reinforcing part 1 can be produced as several separate parts which are then assembled.

Thus, for example, the assembly comprising the flank 2, the stiffener or stiffeners 4 and the rim or rims 5 can be made of composite material in a single step and the cylindrical tubes 3 can be made separately and then attached to the flank 2.

As with the panel 10, and as shown in FIG. 1, a core 6 made of cellular material can advantageously be added to a reinforcing part 1. In such a case, the core 6 takes up almost all the internal volume defined by the reinforcing part 1. Thus, all the internal volume between the skins 11, 12 of the panel 10 is advantageously filled with cellular material, of the core 6 and of the core 13, the core 6 being inserted in the cut-out made in the core 13.

The advantages of the invention will be described with reference to FIG. 7. With reference to this figure, a bracket 15 typically comprises two bores. A first bore, positioned toward the front AV of the panel 10 and of the bracket 15, is used to articulate the panel 10. A second bore 17, positioned at the rear AR of the bracket 15, is used to attach an actuation rod. In addition, the second bore 17 is an application point 17 for a force 18 applied to the panel 10, and more particularly to the skin 12.

In order to distribute the stresses and to utilize the strength of the skins 11, 12, the assembly means 16 passes through the panel 10 from one skin to the other. Several assembly means 16 are used in order to distribute the stresses by dividing a force 18. The force 18 received by a bracket 15 is thus induced in the panel 10, principally at the point where the assembly means 16 pass through the thickness of the panel 10.

A cylindrical tube 3 is secured to the flank 2, and a force 18 imparted by a bracket 15 is transmitted to the assembly means 16. The force 18 is then transmitted to the panel 10 by the intermediary of the cylindrical tubes 3 and is then transmitted, via the connection between the cylindrical tubes 3 and the flank 2, to the flank 2. The flank 2 then distributes it over its entire surface via the contact between the flank 2 and the skin 12.

A reinforcing part 1 produced in this manner, having a flank 2 and at least one cylindrical tube 16 secured thereto, is able to distribute and to diffuse a force 18 transmitted by a bracket 15 to the interface between a bracket 15 and the panel 10, principally the shear component of such a force 18.

When the reinforcing part comprises a stiffener 4 and a rim 5, the stiffener 4 is positioned on a side opposite an application point 17 for the forces, with respect to the cylindrical tubes 3. The panel according to the invention thus makes it possible to distribute the force 18 throughout the panel 10 as the arrangement consisting of the stiffener 4 and the rim 5, which is secured to the flank 2, makes it possible to secure the two skins 11, 12 to one another and thus to distribute the stresses also in the skin 11.

Moreover, a cylindrical tube 3 acts in particular as a spacer between the two skins 11, 12 of a panel 10, in order to prevent the panel 10 being crushed by the skins 11, 12 being forced together under the effect, for example, of the assembly means 16 being tightened.

Thus, the reinforcing part 1, in particular when it comprises a core 6, allows a local increase in the thickness of the skin 12, over the extent of the flank 2. This is particularly advantageous for a skin 12 made of composite material. Indeed, a rapid change of thickness is generally not possible with composite materials. By contrast, a variation in thickness must be very progressive and requires a large transition area.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft wing panel comprising:
   a first skin and a second skin having external faces defining outer surfaces of the wing panel and attached to one another such that the first skin and the second skin converge at the rear portion of the wing panel,
   a first core arranged in a volume delimited by an assembly of the first and the second skin, sandwiched between an internal face of the first skin and an internal face of the second skin,
   a reinforcing part arranged within a cut-out made in the first core, the reinforcing part comprising a flank having one face parallel to and in contact with the internal face of either the first or the second skin and a stiffener extending from the flank toward the internal face of the other of the first or the second skin, wherein the flank, the stiffener, and the internal face of the other of the first or the second skin define a second volume therein,
   a second core separated from the first core by the reinforcing part, wherein the second core occupies the second volume, and
   at least one cylindrical tube secured to the flank arranged perpendicular to the face of the flank,
   the at least one cylindrical tube surrounding a corresponding assembly means passing through the wing panel from the first to the second skin and having one end in contact with the external face of either of the first skin and second skin.

2. The wing panel as claimed in claim 1, wherein the reinforcing part comprises a rim associated with the stiffener, the rim being positioned substantially parallel to and in contact with the other of the first and second skins, the stiffener connecting the rim to the flank.

3. The wing panel as claimed in claim 2, wherein the stiffener is transverse to the flank and transverse to the rim.

4. The wing panel as claimed in claim 2, wherein the stiffener has, in a plane parallel to the face of the flank, a substantially polyhedral shape comprising at least one side around the at least one cylindrical tube.

5. The wing panel as claimed in claim 4, wherein the stiffener has, in a plane parallel to the face of the flank, a substantially circular shape around the at least one cylindrical tube.

6. The wing panel as claimed in claim 3, wherein the stiffener has, in a plane parallel to the face of the flank, a closed shape following an entire periphery of the flank around the at least one cylindrical tube.

7. The wing panel as claimed in claim 1, wherein the reinforcing part comprises a rim associated with the stiffener, the rim being positioned substantially parallel to and in contact with the other of the first and second skins, the stiffener connecting the rim to the flank, wherein a portion of the rim further simultaneously engages the first and the second skin.

8. The wing panel as claimed in claim 1, wherein the reinforcing part comprises a rim associated with the stiffener, the rim being positioned substantially parallel to and in contact with the other of the first and second skins, the stiffener connecting the rim to the flank, such that the reinforcing part forms a pan-shaped form, wherein the second core is positioned within the pan-shaped form.

9. The wing panel as claimed in claim 8, wherein a portion of the rim further simultaneously engages the first and the second skin.

10. The wing panel as claimed in claim 1, wherein the first and second cores are made of a cellular material.

11. An aircraft wing panel assembly comprising:
    at least one bracket having a wing panel fastened thereto wherein the at least bracket provides an articulation to the wing panel,
    the wing panel comprising:
      a first skin and a second skin having external faces defining outer surfaces of the wing panel and attached to one another such that the first skin and the second skin converge at the rear portion of the wing panel,
      a first core arranged in a volume delimited by an assembly of the first and the second skin, sandwiched between an internal face of the first skin and an internal face of the second skin,
      a reinforcing part arranged within a cut-out made in the first core, the reinforcing part comprising a flank having one face parallel to and in contact with the internal face of either the first or the second skin and a stiffener extending from the flank toward the internal face of the other of the first or the second skin, wherein the flank, the stiffener, and the internal face of the other of the first or the second skin define a second volume therein,
      a second core separated from the first core by the reinforcing part, wherein the second core occupies the second volume, and
      at least one cylindrical tube secured to the flank arranged perpendicular to the face of the flank,
      the at least one cylindrical tube surrounding a corresponding assembly means passing through the wing panel from the first to the second skin and having one end in contact with the external face of either of the first skin and second skin,
      the at least one assembly means being secured to the bracket and passing through the wing panel, and being received in the at least one cylindrical tube.

12. The wing panel assembly as claimed in claim 11, wherein the reinforcing part comprises a rim associated with the stiffener, the rim being positioned substantially parallel to and in contact with the other of the first and second skins, the stiffener connecting the rim to the flank, wherein a portion of the rim further simultaneously engages the first and the second skin.

13. The wing panel assembly as claimed in claim 11, wherein the reinforcing part comprises a rim associated with the stiffener, the rim being positioned substantially parallel to and in contact with the other of the first and second skins, the stiffener connecting the rim to the flank, such that the reinforcing part forms a pan-shaped form, wherein the second core is positioned within the pan-shaped form.

14. The wing panel as claimed in claim 13, wherein a portion of the rim further simultaneously engages the first and the second skin.

15. The wing panel as claimed in claim 11, wherein the first and second cores are made of a cellular material.

\* \* \* \* \*